United States Patent
Krongauz et al.

(10) Patent No.: US 6,506,814 B2
(45) Date of Patent: Jan. 14, 2003

(54) DIELECTRIC, RADIATION-CURABLE COATING COMPOSITIONS

(75) Inventors: Vadim V. Krongauz, Barlett; Chau T. M. Ha, Arlington Heights; Sangeeta Rampuria, Des Plaines, all of IL (US)

(73) Assignee: DSM N.V., Heerlen (NL)

( * ) Notice: Subject to any disclaimer, the term of this patent is extended or adjusted under 35 U.S.C. 154(b) by 105 days.

(21) Appl. No.: 09/073,863

(22) Filed: May 7, 1998

(65) Prior Publication Data

US 2002/0004537 A1 Jan. 10, 2002

Related U.S. Application Data

(63) Continuation-in-part of application No. 08/961,084, filed on Oct. 30, 1997, and a continuation-in-part of application No. 09/048,981, filed on Mar. 27, 1998, now abandoned.

(51) Int. Cl.$^7$ ...................... C08F 290/14; C08G 18/44; C08G 75/00
(52) U.S. Cl. ................. 522/33; 522/182; 522/183; 522/96; 522/97; 522/167; 522/172; 522/180; 522/37; 522/41; 522/46; 522/51; 522/64; 528/26; 528/65; 528/376
(58) Field of Search ................. 522/96, 90, 98, 522/173, 174, 175, 180, 183, 182, 167, 172, 97, 33, 37, 41, 46, 51, 64; 524/82, 750; 528/26, 65, 376

(56) References Cited

U.S. PATENT DOCUMENTS

| | | | |
|---|---|---|---|
| 4,031,066 A | * 6/1977 | Mori et al. | 524/474 |
| 4,481,258 A | 11/1984 | Sattler et al. | |
| 4,572,610 A | * 2/1986 | Krajewski | 385/141 |
| 4,686,543 A | 8/1987 | Tani | |
| 4,731,620 A | 3/1988 | Yabe | |
| 4,740,532 A | 4/1988 | May et al. | |
| 4,760,012 A | 7/1988 | Mochizuki | |
| 4,786,586 A | * 11/1988 | Lee et al. | 430/532 |
| 4,861,637 A | 8/1989 | Ueda | |
| 4,865,949 A | 9/1989 | Yamamuro | |
| 4,906,675 A | 3/1990 | Inagaki | |
| 4,915,997 A | 4/1990 | Yamamuro | |
| 4,931,337 A | 6/1990 | Miyazaki | |
| 5,128,388 A | 7/1992 | Komori | |
| 5,128,391 A | 7/1992 | Shustack | |
| 5,213,947 A | 5/1993 | Ueda | |
| 5,360,652 A | * 11/1994 | Kobayashi | |
| 5,426,166 A | * 6/1995 | Usifer et al. | 526/301 |
| 5,445,855 A | 8/1995 | Tokita | |
| 5,550,171 A | 8/1996 | Kuczynski | |
| 5,635,268 A | 6/1997 | Miyake | |
| 5,847,021 A | * 12/1998 | Tortorello et al. | 522/90 |
| 5,980,995 A | 11/1999 | Linsenbardt et al. | |
| 6,021,338 A | 2/2000 | Zahora et al. | |

FOREIGN PATENT DOCUMENTS

| | | |
|---|---|---|
| EP | 243802 | 11/1987 |
| EP | 0 801 041 | * 10/1997 |
| FR | 2328752 | 5/1997 |
| JP | 7-57551 | * 3/1995 |
| WO | 91/03498 | 3/1991 |
| WO | 98/19313 | 5/1998 |
| WO | 98/36325 | * 8/1998 |
| WO | 98/45344 | * 10/1998 |

OTHER PUBLICATIONS

Bagdasar'yan, K.S., "Theory of Free–Radical Polymerization", Israel Progr. Sci. Translation (1968).

(List continued on next page.)

Primary Examiner—Susan W. Berman
(74) Attorney, Agent, or Firm—Pillsbury Winthrop LLP

(57) ABSTRACT

A UV-curable acrylate-thiol-ene insulating coating composition for electrical conductors, a method of manufacturing a UV-curable acrylate-thiol-ene insulating coating composition for electrical conductors. The insulating coating being of about 2.5 μm to about 500 μm thickness, which cured coating has a dielectric dissipation factor (60 Hz, 24° C.) of lower than about 0.05.

33 Claims, 2 Drawing Sheets

OTHER PUBLICATIONS

Roffey, C.G., "Photopolymerization of Surface Coatings", (John Wiley & Sons) (1982), pp. 67–136.

Chiou et al., "Real–Time and in Situ Rheological Studies on the UV Curing Kinetics of Thiol–ene Polymers", Macromolecules, vol. 30, No. 23 (1997) pp. 7322–7328.

Block, D.G., "Bonding Still a Sticky Issue for DVD", Radtech Report (Mar./Apr. 1997) pp. 25–27.

Allen, N.S., "Polymer Photochemistry", Photochemistry (1997) vol. 28, pp. 381–452.

Lai, Y., "Effect of Crosslinkders on Photocopolymerization of N–vinylpyrrolidone and Methacrylates to Give Hydrogels", J. Appl. Polym. Sci. (1997), 66(8), pp. 1475–1484.

Arkles et al., "Factors Contributing to the Stability of Alkoxysilanes in Aqueous Solution", Silicon Compounds Register and Review, Silanes and Silicones for Creative Chemists.

Takeishi, M., "Photopolymerization of N–vinylpyrrolidone Accelerated by Oxygen", Journal of Polymer Science: Part C: Polymer Letters, vol. 27 (1989), pp. 301–305.

* cited by examiner

DIELECTRIC, RADIATION-CURABLE COATING COMPOSITIONS

This is a Continuation-in-Part of: U.S. application Ser. No. 08/961,084 filed Oct. 30, 1997 and U.S. application Ser. No. 09/048,981 filed Mar. 27, 1998, now abandoned.

FIELD OF THE INVENTION

This invention relates to radiation-curable coating compositions for coating electrical conductors, and in particular, to coating compositions which provide good insulating properties in extreme conditions.

DESCRIPTION OF RELATED ART

Electrical conductors are in general coated with a dielectric coating for insulating the conductor. Such coatings require good insulating properties in a wide variety of application environments including, for example, microelectronics applications such as, for example, semiconductors, printed circuit boards, capacitors and resistors, and heavy industrial applications such as, for example, motors, coils, generators and transformers and electrical wiring systems. In certain applications, for example, microelectronics applications, a highly efficient thinly applied coating is most desirable. In other applications, for example, heavy industrial applications, it is particularly important for such coatings to provide good insulating properties under extreme conditions such as in transformer coils found in power distribution transformers. U.S. Pat. No. 4,481,258 issued to Sattler et al. discloses the use of paper as insulating material. Although Sattler proposes a UV-curable coating be used as insulating material, it fails to disclose a coating with properties which are sufficient to meet the requirements of an insulator in extreme conditions. The coatings proposed in Sattler are certain UV-curable materials comprising acrylate-ester adducts, acrylate urethane adducts and acrylate functional diluents. These coatings require both UV cure and an additional thermal post-cure at a temperature of 130° C. for 4–17 hr. The use in transformer coils of the coatings and processes disclosed in Sattler is unattractive, in particular because of the post-cure required. Because the coating of Sattler fails to provide an acceptable substitute for conventional materials used in transformers, paper insulation materials are still being used in the manufacture of transformer coils.

Effective insulating coatings, under the most rigorous environmental conditions such as, for example, high power transformer coils, should exhibit the desirable properties described below.

As the electrical conductor is coated and thereafter is bent in a required form, the cured coating should be flexible so that it can withstand bending of the coated conductor as it is wound into a coil.

The cured coating should be able to withstand immersion in oil for 28 days at 150° C. as described in the aforementioned U.S. Pat. No. 4,481,258.

The cured coating should remain adherent at elevated temperature that is encountered when the transformer is under load.

The cured coating should have a dielectric constant smaller than 5 at 60 Hz (24° C.).

The cured coating should have a dielectric dissipation factor smaller than 0.05 at 24° C. before and after hot oil exposure and smaller than 0.5 at 150° C., both at 60 Hz.

SUMMARY OF THE INVENTION

It is an object of the present invention to provide dielectric radiation-curable coating compositions, which have the properties identified above, for use as insulating coatings for a wide variety of electrically conductive substrates.

It is further an object of the present invention to disclose a method of manufacture of dielectric radiation-curable coating compositions, which have the properties identified above.

The present invention relates to a dielectric radiation-curable coating composition which can be applied to an electrical conductor, the composition, after cure providing a coating of a thickness of about 2.5 µm to about 500 µm and preferably about 10 µm to about 50 µm, which cured coating has a dielectric dissipation factor (60 Hz, 24° C.) of lower than about 0.05, the coating composition being formulated from the combination of the following pre-mixture ingredients:

(A) about 15 wt. % to about 80 wt. % of at least one UV or radiation-curable acrylate oligomer;

(B) about 1 wt. % to about 20 wt. % of at least one vinyl reactive diluent or ene reactive diluent;

(C) about 10 wt. % to about 80 wt. % of at least one acrylate monomer diluent;

(D) about 0.5 wt. % to about 10 wt. % of at least one thiol compound, and (E) optionally at least one additional additive, wherein the pre-mixture ingredients correspond to the identity of radiation-curable composition components prior to mixture with other ingredients.

Furthermore, the invention relates to a method of manufacturing an insulating radiation-cured coating on an electrical conductor comprising the steps of:

(A) coating an electrical conductor with a radiation-curable coating composition, the coating composition being formulated from the following premixture ingredients:

(i) about 15 wt. % to about 80 wt. % of at least one UV or radiation-curable acrylate oligomer;

(ii) about 1 wt. % to about 20 wt. % of at least one vinyl reactive diluent or ene reactive diluent;

(iii) about 10 wt. % to about 80 wt. % of at least one acrylate monomer diluent;

(iv) about 0.5 wt. % to about 10 wt. % of at least one thiol compound, and (v) optionally at least one additional additive, wherein the pre-mixture ingredients correspond to the identity of radiation-curable composition components prior to mixture with other ingredients; and (B) exposing the electrical conductor coated with said coating composition to an effective amount of radiation to sufficiently cure the coating composition to form an insulating radiation-cured coating on the electrical conductor, wherein said insulating radiation-cured coating has a dielectric dissipation factor at 60 Hz at 24° C. of lower than about 0.05 and a dissipation factor at 60 Hz at 150° C. of lower than about 0.5 and an elongation at 25° C. of a 25 µm thick coating of greater than about 50%.

The present invention provides for the production of an improved insulating radiation-curable coating for an electrical conductor, the cured coating demonstrating strong adhesion to the surface of the electrical conductor at ambient conditions as well as after exposure to 150° C. oil.

Good adhesion of the insulating radiation-curable coating to a wide variety of materials which can be used as electrical conductors, is desirable. Acrylate oligomers are known in field of adhesives. According to the invention, co-polymerization of thiol and vinyl compounds with urethane acrylates creates a urethane-acrylate-thiol-ene hybrid coating with superior adhesive properties to urethane acrylate coatings lacking the thiol-ene system. The present invention provides a radiation-curable coating composition with good adhesion to the underlying electrically conductive substrate while providing superior insulating qualities. This is important for long lasting bonding between the insulating coating and the underlying substrate under adverse environmental conditions, particularly elevated temperatures and humidity levels, the creation of hybrid acrylate-thiol-ene adhesive formulations is a marked improvement over the current methodology.

Co-pending U.S. patent application Ser. No. 08/961,084 filed Oct. 30, 1997 discloses the use of radiation-curable compositions for use as electrical conductor insulating coatings, the complete disclosure of which is incorporated herein by reference. Co-pending U.S. patent application Ser. No. 09/048,981, filed Mar. 27, 1998, discloses the use of thiol-ene systems as adhesives, the complete disclosure of which is incorporated herein by reference.

The thiol-ene systems of the present invention appear to allow copolymerization of vinyl moieties with acrylate moieties. In the absence of thiols, copolymerization of, for example, N-vinyl compounds is slow. Thiol compounds act as chain transfer agents, which may increase cure speed. Thiol chain transfer also facilitates co-polymerization of acrylate and vinyl compounds usually hindered in the absence of thiol. Co-polymers of vinyl and acrylate have increased flexibility and elongation (compensate for film shrinkage upon cure), which is essential for use with flexible substrates. Mechanisms of thiol chain transfer are described in Takeishi, J. Polym. Sci., 27:301–305 (1989) and Kirsh, Polym. Sci., 35(2): 98–114 (1993), the entire contents of which are incorporated herein by reference.

DETAILED DESCRIPTION OF THE INVENTION

Figure 1:
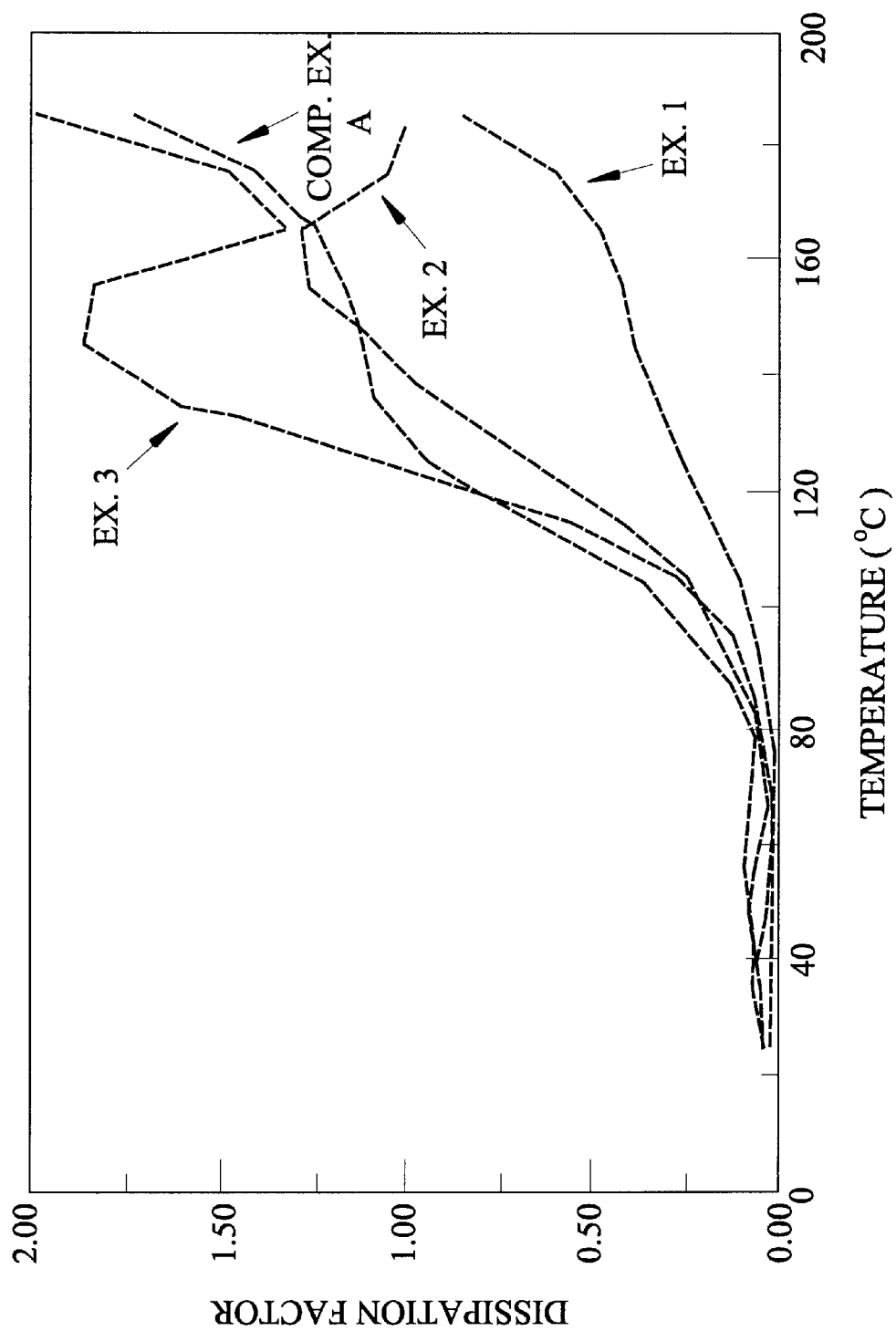
FIG. 1 provides a graphical illustration of the temperature dependence of electrical dissipation factor of the radiation-cured coatings of Examples 1–3 of the present invention and Comparative Example A.

The cured coating, as an insulating layer on an electrical conductor, has outstanding insulating properties, both at low and high temperature. The insulating cured coating layer appears to have a low dielectric constant, e.g. lower than about 5 (60 Hz, 24° C.) and a good dielectric breakdown value. Furthermore, the cured coating is flexible and has high elongation as to allow bending of the coated electrical conductor. Efficiencies of good cure speed are not diminished in the composition of the present invention.

The electrical conductor to which the coating composition of the present invention is applied can be manufactured from a variety of materials to include, for example, metals, ceramics, silicones and polymers. In particular metallic conductors are preferred. Most preferred are conductors manufactured from iron, aluminum, copper or silver. The shape or form of the electrical conductor coated with the present invention is not limited. The form of the electrical conductor can include, for example, a wire, strip, coil, plate, microchip or the like. The conductor can be shaped as necessary to meet the requirements of the application, such as for example, in a shape having a rectangular, square, oval or round cross-section. The coated electrical conductor can be used in microelectronics, semiconductors, capacitors, resistors, printed circuit boards, transformers, generators, motors, electrical wiring systems and the like. The coated electrical conductor can be used in relatively low-stress environments which require high insulating qualities from a very thin coating such as, for example, in microelectronic circuitry and semiconductor technology. Because of the outstanding properties of the cured coating of the present invention, the coated electrical conductor can also be used in extreme environmental conditions such as, for example, hot oil environments. Hence, the invention is well suited for coating aluminum or copper strip or wire used in forming power distribution transformer coils. When employed as an electrical conductor coating in transformer coil applications, the cross-section of the strips commonly ranges from about 0.1–1.7 mm thick and 7–60 cm wide. The strips are wound into coils which are then assembled with cores to form transformers.

The electrical conductor is coated with a radiation-curable coating composition and subsequently cured to provide a protective, insulating coating. In general, the electrical wire or strip is coated as a straight continuous web and the coated electrical wire or strip may be wound for storage or for direct use. Hence, the coating when cured, should be cured well at the surface so that no blocking occurs in case the electrical conductor is stored. Further, the cured coating of the present invention is flexible and has high elongation under stress so that winding for either storage, and/or bending of the coil or wire in the manufacture of articles like transformers does not cause damage to the cured coating. Thus, the cured coating measured at 25 $\mu$m thickness, preferably has an elongation of at least about 50%, and more preferably at least about 100%. Insulating coatings prepared according to the present invention have demonstrated elongation of at least about 200%.

As the coated electrical conductor can be used in a hot oil environment, most preferably the cured coating has a dissipation factor at 60 Hz at 150° C. of lower than about 0.5. Furthermore, the cured coating preferably has an electrical dissipation factor at 60 Hz at 24° C. before and after a hot oil aging test of lower than about 0.05.

The cured coating of the present invention exhibits its insulating properties even when formed as a very thin film. The cured coating has a thickness of about 2.5 $\mu$m to about 500 $\mu$m, preferably between about 10 $\mu$m to about 100 $\mu$m and more preferably between about 10 $\mu$m to about 50 $\mu$m.

The significance of the present composition is the novel formulation it sets forth for synthesizing an insulating coating composition with strong bonding properties for a wide variety of electrically conductive substrates to include, for example, metals, ceramics, silicones, and polymers. An important aspect of the present invention is the co-polymerization of acrylate oligomers and acrylate monomer diluents with thiol-ene systems. Acrylate monomers are preferred for their high rates of polymerization. The thiol-ene system, comprising vinyl or ene and thiol compounds, significantly improves the insulative and adhesive properties of acrylate coatings for use in providing an insulating coating for a variety of substrates.

A suggested mechanism for photoactivated thiol-ene reactions includes UV absorption by a photoinitiator, which initiates free radical formation of thiyl radical species, followed by radical sulfur attack of an unsaturated carbon in a vinyl compound, concluding with termination by formation of radical-radical combinations, for example, disulfide bonds between the radical thiol compounds. When used during the co-polymerization of acrylate oligomers and acrylate monomer diluents, thiol-ene systems substantially improve the bonding properties of radiation-curable insulating compositions. The result is an acrylate-thiol-ene hybrid coating that, for example, imparts superior insulative and adhesive properties to electrically conductive substrate surfaces.

Thiol-ene systems can be included in acrylate compositions for insulating coatings to promote their adhesive capabilities. When acrylated-thiol-ene systems of the present invention are radiation-cured on a substrate, such as an electrically conductive material, the final result is a product having good insulating properties, strong adhesion and good bonding strength.

The types and amounts of acrylate oligomer, vinyl reactive diluent, acrylate monomer diluents, thiol compounds and additives may be adjusted according to the ultimate use of the product. Compositions can comprise at least one radiation-curable monomer, at least one radiation-curable monomer diluent, at least one photoinitiator, at least one thiol compound, and optional additives. The composition may be tailored to maximize the insulative property, adhesiveness, reduce the viscosity, shorten cure speed, and the like of the cured material. For example, acrylate diluent monomers and optionally silane compounds, may be added at varying effective concentrations to achieve improved viscosity and adhesion, respectively. By altering the ratios of components, other desirable properties, including high optical transparency, toughness, chemical resistance, and abrasion resistance, may be promoted.

The exact combinations selected for the use in radiation-curable insulating coating compositions may vary, depending upon the other components of the composition and the light source used to cure the composition. Components should be excluded from the formulation which, prior to cure, cause insoluble salts to form, which may impair the clarity of the cured coating.

The radiation-curable compositions can be cured by conventional means. For instance, the radiation source can be a conventional light source, such as, for example, ultraviolet (UV) lamps available from Fusion Systems Corp. In addition, low-, medium- and high-pressure mercury lamps, superactinic fluorescent tubes or pulse lamps are suitable. Radiation-cure is preferably by actinic radiation and more preferably by UV radiation. When using the preferred UV cure of the insulating coating compositions, proper control of light intensity is important to help control shrinkage of the polymerized material. The composition can be cured by irradiation with light with a wavelength between about 200 $\mu$m to about 700 $\mu$m.

The radiation-curable oligomer can be any radiation-curable oligomer used in radiation-curable, coating compositions. An example of a suitable radiation-curable oligomer includes an urethane oligomer having a molecular weight of at least about 500 and containing at least one ethylenically unsaturated group that can be polymerized through actinic radiation. For example, if the diluent is present in the coating composition, the ethylenically unsaturated group can be the reactive terminus of the oligomer to which the reactive diluent is bound when the composition is cured. Preferably, the oligomer has two terminal radiation-curable functional groups, one at each end of the oligomer.

Representative oligomers are disclosed in, for example, U.S. Pat. No. 4,932,750, issued to Ansel et al., the complete disclosure of which is hereby incorporated by reference.

The radiation-curable oligomer is preferably present in an amount of about 15% to about 80% by weight, and more preferably, about 15 wt. % to about 75 wt. %.

Examples of suitable radiation-curable functional groups which can be present on the oligomer include ethylenically unsaturated groups having (meth)acrylate or vinylether. The language "(meth)acrylate" as used herein, means methacrylate, acrylate, or mixtures thereof.

Preferably, the radiation-curable group in the oligomer is a (meth)acrylate or vinylether group. Most preferably, the radiation-curable group is an acrylate group.

Preferably, the oligomer contains at least two ethylenically unsaturated groups which are bound to an oligomer backbone. For example, ethylenically unsaturated groups can be present at each end of the oligomer backbone as reactive termini. The oligomer backbone can be, for example, based on a polyether, polyolefin, polyester, polycarbonate, acrylic, hydrocarbon, polyolefin, or copolymers thereof. The oligomer can comprise a hydrocarbon backbone which is fully saturated. Preferably, the oligomer backbone comprises repeating urethane units.

The radiation-curable oligomer can be an acrylic oligomer comprising at least one radiation-curable (meth)acrylate group, and preferably, at least one acrylate group. These are known in the art as acrylated acrylics.

The invention is not believed to be limited by the way in which the acrylated acrylic oligomer, or any other oligomer, is prepared. Oligomer synthetic routes for acrylated acrylics can, for example, involve an esterification of a hydroxyl-functional acrylic oligomer with (meth)acrylic acid, or the reaction of an epoxy-functional acrylic oligomer with (meth) acrylic acid. These acrylated acrylics can include urethane linkages. Preferred acrylated acrylic oligomers include species of at least Mn 5,000. Preferred acrylated urethane acrylics are described in U.S. Pat. No. 5,847,021 the entire contents of which is hereby incorporated by reference.

Acrylated acrylics can be prepared by known synthetic methods including, for example, (1) partial esterification of acrylic polymers having pendant carboxylic acid group with hydroxyethyl acrylate or glycidyl methacrylate, or in the alternative, acrylation of glycidyl methacrylate terpolymer with acrylic acid, or (2) polymerization of monomers which already have acrylate groups such as, for example, allyl methacrylate or N,N-dimethylaminoethyl methacrylate.

The acrylic oligomer typically will have a copolymeric backbone. The Tg (glass transition temperature) of the oligomer can be lowered by decreasing the content of methyl methacrylate.

(Meth)acrylic acid and ester polymers are disclosed in, for example, *Encyclopedia of Polymer Science & Engineering*, Vol. 1, 1985, pgs. 211–305, the complete disclosure of which is hereby incorporated by reference.

The oligomer backbone can comprise one or more oligomeric blocks coupled with each other via, for example, urethane linkages. For example, one or more types of polyol prepolymers can be linked by methods known in the art.

If the oligomer backbone is a polyether, the resulting insulating coating can have a low glass transition temperature and good mechanical properties. If the oligomer backbone is a polyolefin, the resulting insulating coating can have a further improved water resistance. Polycarbonate-based oligomers can provide for good stability.

Oligomers with repeating urethane units can be, for example, prepared by reaction of (i) an oligomer polyol, (ii) a di- or poly-isocyanate and (iii) a hydroxy functional ethylenically unsaturated monomer such as, for example, hydroxyalkyl(meth)acrylate.

If an oligomer backbone polyol is used, preferably it has on average at least about two hydroxyl groups. The oligomer backbone polyol may have, on average, more than two hydroxyl groups. Examples of such an oligomer diol include polyether diols, polyolefin diols, polyester diols, polycarbonate diols, and mixtures thereof. Polyether and polycarbonate diols, or combinations thereof, are preferred.

If a polyether diol is used, preferably the polyether is a substantially non-crystalline polyether. Preferably, the polyether comprises repeating units of one or more of the following monomer units:

—O—CH$_2$—CH$_2$—
—O—CH$_2$—CH(CH$_3$)—
—O—CH$_2$—CH$_2$—CH$_2$—
—O—CH(CH$_3$)—CH$_2$—CH$_2$—
—O—CH$_2$—CH(CH$_3$)—CH$_2$—
—O—CH$_2$—CH$_2$—CH$_2$—CH$_2$—
—O—CH$_2$—CH(CH)$_3$—CH$_2$—CH$_2$—
—O—CH(CH$_3$)—CH$_2$—CH$_2$—CH$_2$—.

An example of a polyether polyol that can be used is the polymerization product of 20 percent by weight of 3-methyltetrahydrofuran and 80 percent by weight of tetrahydrofuran, both of which have undergone a ring opening polymerization. This polyether copolymer contains both branched and non-branched oxyalkylene repeating units and is marketed as PTGL 1000™ (Hodogaya Chemical Company). Another example of a polyether which can be used is polyarylicdiol.

Examples of polycarbonate diols are those conventionally produced by the alcoholysis of diethylene carbonate with a diol. The diol can be, for example, an alkylene diol having about 2 to about 12 carbon atoms, such as, 1,4-butane diol, 1,6-hexane diol, 1,12-dodecane diol, and the like. Mixtures of these diols can also be utilized. The polycarbonate diol can contain ether linkages in the backbone in addition to carbonate groups. Thus, for example, polycarbonate copolymers of alkylene oxide monomers and the previously described alkylene diols can be used. Admixtures of the polycarbonate diols and polycarbonate copolymers can also be utilized.

Polycarbonate diols include, for example, DURACARB 122™ (PPG Industries) and PERMANOL KM10-1733™ (Permuthane, Inc., MA.). DURACARB 122™ is produced by the alcoholysis of diethylcarbonate with hexane diol.

Any organic polyisocyanate (ii), alone or in admixture, can be used as the polyisocyanate. Thereby, a product is obtained which is end-capped with the reaction product from the isocyanate/ethylenically unsaturated monomer reaction on at least one end of the molecule. "End-capped" means that a functional group caps one of the two ends of the oligomer diol.

The isocyanate/hydroxy functional monomer reaction product attaches to the oligomer backbone (i) diol via a urethane linkage. The urethane reactions can take place in the presence of a catalyst. Catalysts for the urethane reaction include, for example, dibutyl-tin dilaurate, diazabicyclooctane crystals and the like.

Preferably the polyisocyanate (ii) is a diisocyanate. Examples of diisocyanates (ii) include isophorone diisocyanate (IPDI), tetramethylxylene diisocyanate (TMXDI), toluene diisocyanate (TDI), diphenylmethylene diisocyanate, hexamethylene diisocyanate, cyclohexylene diisocyanate, methylene dicyclohexane diisocyanate, 2,2,4-trimethyl hexamethylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, and polyalkyloxide and polyester glycol diisocyanates such as polytetramethylene ether glycol terminated with TDI and polyethylene adipate terminated with TDI, respectively. Preferably, the diisocyanates are non-yellowing diisocyanates such as isophorone diisocyanate.

Generally the compound providing a reactive terminus (iii) contains a functional group which can polymerize under the influence of actinic radiation, and the compound contains a functional group which can react with the diisocyanate. Hydroxy functional ethylenically unsaturated monomers are preferred. More preferably, the hydroxy functional ethylenically unsaturated monomer contains acrylate, (meth)acrylate or vinyl ether functionality.

The composition according to the invention may comprise at least two reactive diluents. The reactive diluents can be used to adjust the viscosity of the insulating coating composition. Thus, the reactive diluents can each be a low viscosity monomer containing at least one functional group capable of polymerization when exposed to actinic radiation. For example, vinyl reactive diluents and acrylate monomer diluents may be used.

The reactive diluent is preferably added in such an amount that the viscosity of the coating composition is in the range of about 100 to about 1,000 mPas. Suitable amounts of the reactive diluents have been found to be about 5 wt. % to about 80 wt. %, and more preferably about 10% to about 75% by weight.

The reactive diluents preferably have a molecular weight of not more than about 550 or a viscosity at room temperature of less than about 500 mPas (measured as 100% diluent).

The functional group present on the reactive diluents may be of the same nature as that used in the radiation-curable oligomer. Preferably, the radiation-curable functional group present in the reactive diluent is capable of copolymerizing with the radiation-curable functional group present on the radiation-curable oligomer.

Preferably, the reactive diluent system comprises monomers having an acrylate and vinyl ether functionality and a $C_4$–$C_{20}$ alkyl or polyether moiety. Examples of such reactive diluents are hexyl acrylate, 2-ethylhexyl acrylate,
isobornyl acrylate,
decyl acrylate,
lauryl acrylate,
stearyl acrylate,
ethoxyethoxy-ethyl acrylate,
isodecyl acrylate,
isooctyl acrylate,
laurylvinyl ether,
2-ethylhexylvinyl ether,
N-vinyl formamide and derivatives thereof,
N-vinyl carbazole,
N-vinyl-caprolactam,
N-vinylpyrrolidone and the like.

The vinyl reactive diluent, such as N-vinylpyrrolidone, is present in an amount between about 1 wt. % and about 20 wt. %, preferably between about 1 wt. % and about 8 wt. %, and more preferably between about 1 wt. % and about 5 wt. %.

The acrylate monomer diluent, such as isobornyl acrylate, is preferably present in the range of about 10 wt. % to about 80 wt. %.

Furthermore, the reactive diluents preferably contain two groups capable of polymerization using actinic radiation. A diluent having three or more of such reactive groups can be present as well. Examples of such monomers include:

$C_2$–$C_{18}$ hydrocarbondioldiacrylates,
$C_4$–$C_{18}$ hydrocarbondivinylethers,
$C_3$–$C_{18}$ hydrocarbontrioltriacrylates,
the polyether analogues thereof, and the like, such as 1,6-hexanedioldiacrylate,
trimethylolpropanetriacrylate,
hexanedioldivinylether,
triethyleneglycoldiacrylate,
pentaeritritoltriacrylate, and
tripropyleneglycol diacrylate.

Preferably, the oligomer and the at least one reactive diluent each contain an acrylate group as a radiation-curable group.

The composition may optionally further comprise at least one photoinitiator. The photoinitiator is required for fast UV cure. Conventional photoinitiators can be used. Examples include benzophenones, acetophenone derivatives, such as alpha-hydroxyalkylphenylketones, benzoin alkyl ethers and benzil ketals, monoacylphosphine oxides, and bisacylphosphine oxides. A preferred photoinitiator is 2 hydroxy-2-methyl-1-phenyl-propan-1-one(DAROCURE 1700™, Ciba Geigy). Another preferred example is 2,2-dimethoxy-2-phenyl acetophenone (IRGACURE 651™, Ciba Geigy). Other suitable photoinitiators include mercaptobenzothiazoles, mercaptobenzooxazoles and hexaryl bisimidazole. Often, mixtures of photoinitiators provide a suitable balance of properties. The photoinitiator is present in an amount of about 1 wt. % to about 10 wt. %.

Thiol compounds can be used in UV-curable acrylate oligomer compositions to enhance the bonding properties of the coatings. Preferably, the reactive diluent forms thioether linkages during radiation-cure. Such thioether linkages can form by thiol-ene reactions. Thiol-ene systems are the result of combining thiol moieties, such as mercapto silanes, and vinyl components, such as N-vinyl pyrrolidone during radiation cure. Aliphatic thiol compounds, such as $C_5$–$C_{30}$, preferably $C_5$–$C_{20}$ alkanethiol compounds, are suitable reactants. Examples of alkanethiols include 1-pentanethiol, 1-hexanethiol, 1-heptanethiol, 1-octanethiol, 1-decanethiol, 1-dodecane-thiol, and the like. Compounds comprising a plurality of mercapto groups can be used, including di- and tri-mercapto compounds. Preferred examples of thiol compounds are γ-mercaptopropyltrimethoxysilane and γ-mercaptopropyltriethoxysilane. Thioethers are also preferred. Such thiol-ene systems, when copolymerized with acrylates, provide for compositions with superior adhesive qualities.

Additionally, additives may be included in the formulations. Minor amounts of UV absorbers, typically those of the benzotriazole, benzophenone or oxanilide type, or sterically hindered amine type (HALS) may be added as light stabilizers.

Further customary additives as used in the art include fillers, chain transfer agents, plasticizers, wetting agents, stabilizers, adhesion promoters or leveling agents.

The composition preferably also contains an adhesion promoter. The adhesion promoter is preferably a compound having groups participating in the radical curing reaction, and a group that adheres to the electrical conductor. The group that participates in the curing reaction can be preferably, vinyl, (meth)acrylate or thiol. The group that adheres to the electrical conductor preferably is hydroxy, acid, zirconate, titanate or silane. The acid may be for example carboxylic phosphoric or sulphonic. Most preferred is a (meth)acrylate functionalized carboxylic acid or phosphoric acid. Some examples of suitable adhesion promoters include, but are not limited to, hydroxyethyl(meth)acrylate, hydroxypropyl(meth)acrylate, di- or trialkoxy zirconates or titanates, vinyl trimethoxysilane, mercaptopropyltrimethoxy silane, isocyanotoalkyltrialkoxysilanes, methacrylylalkyltrialkoxysilanes, amino alkyltrialkoxysilanes and epoxyalkyltrialkoxy silanes. The alkyl group generally is propyl, and as the alkoxy group, methoxy or ethoxy is preferred. Another suitable silane adhesion promoter is vinyltrimethoxysilane. Mercaptosilanes, such as mercaptopropyltrimethoxysilane and mercaptopropyltriethoxysilane, are particularly preferred. Additional examples of suitable adhesion promoters include acrylic acid, methacrylic acid, β-carboxyethyl acrylate, EBERCYL 170™ and EBERCYL 168™. The EBERCYL™ products are acrylate ester derivatives, available from Radcure Specialties in Atlanta, Ga. and are phosphoric acid based adhesion promoters. EBERCYL 170™ AND EBERCYL 168™ are preferred for use when high resistance to moisture is required.

Mono or diester of phosphoric acid having the following formula are also suitable adhesion promoters:

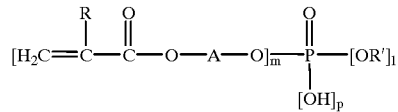

where
m+g+p=3
R=H or $CH_3$
A=$C_nH_{2n}$, and $2 \leq n \leq 6$
R'=$C_1$ to $C_{14}$ alkyl, aryl, alkaryl, or alkyleneoxy.

Representative of the various species of organophosphate esters having the above formula include, but are not limited to, (1) methylmethacryloyloxyethyl phosphate, where (R=$CH_3$; A=—$C_2H_4$—; R'=$CH_3$, m=1 and p=1);
(2) ethyl methacryloyloxyethyl phosphate, where (R=$CH_3$; A=—$C_2H_4$—; R'=$C_2H_5$); m=1 and p=1);
(3) propylacryloyloxyethyl phosphate, where (R=H; A=—$C_2H_4$—; R'=$C_3H_7$; m=1 and p=1);
(4) methyl acryloyloxyethylphosphate, where (R=H, A=—$C_2H_4$—; R'=$CH_3$, m=1 and p=1);
(5) ethylacrylyoyloxyethylphosphate, where (R=H; A=—$C_2H_4$—; m=1 and p=1; R'=$C_2H_5$);
(6) propylmethacryloyloxy-ethylphosphate, where (R=$CH_3$; A=—$C_2H_4$—; R'=$C_3H_7$; m=1 and p=1);
(7) bis(methacryloxyethyl)phosphate, where (R=$CH_3$; A=—$C_2H_4$—; m=2; l=0; p=1); and
(8) bis(acryloxyethyl)phosphate, where (R=H; A=—$C_2H_4$—; m=2; l=0; p=1).

The adhesion promoter helps the coating composition adhere to the electrical conductor. The adhesion promoter may be used in an amount in the range of about 0.2 wt. % to about 5 wt. % of the composition. Care should be exercised, that the amount of adhesion promoter is not so large that insulating properties are decreased below acceptable level.

It is an unexpected advantage of the coating composition of the present invention, that an adhesion promoter can be used in effective amounts while maintaining very good insulating properties for the cured coating.

Thermal antioxidants may bemused to improve thermal and oxidative stability. Other polymers and oligomers can be added to the compositions as needed.

Figure 2:
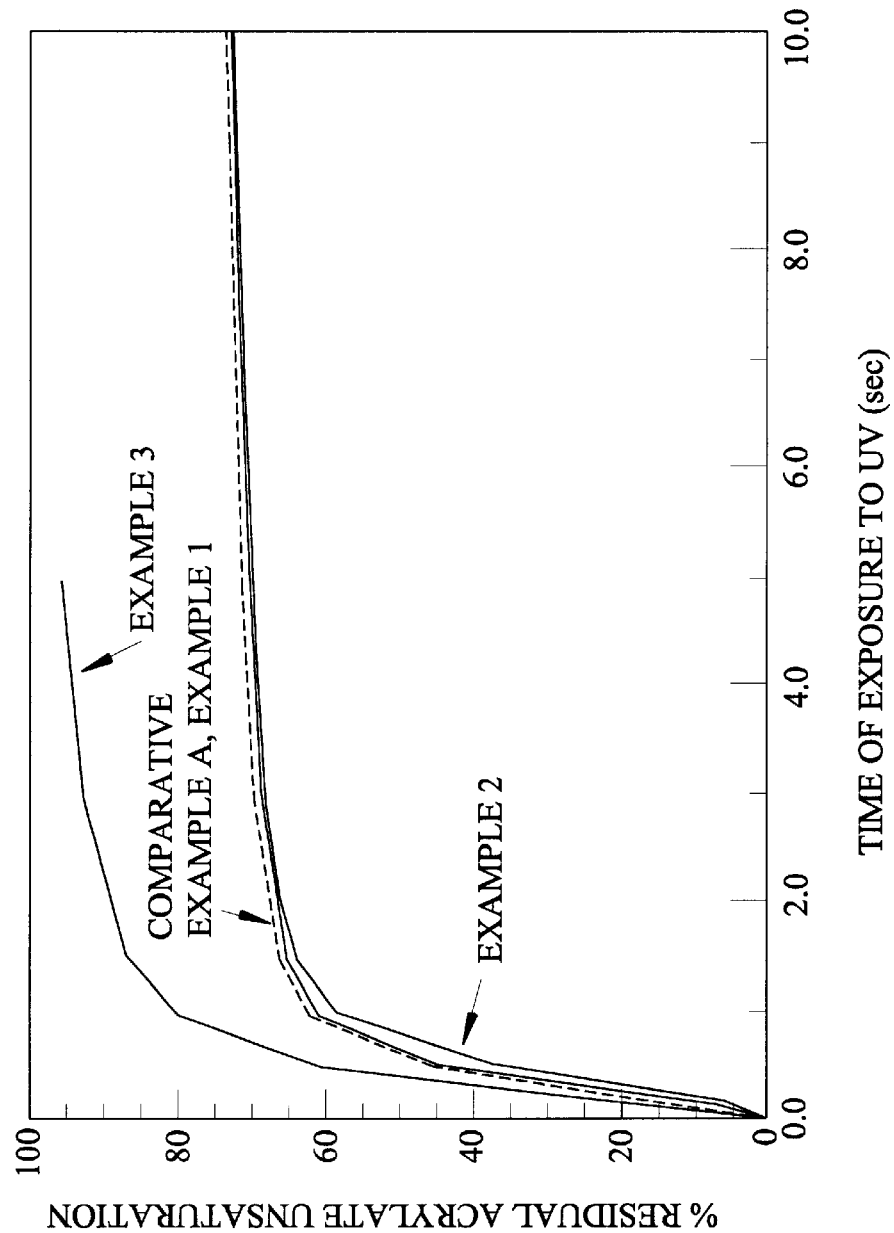
FIG. 2 provides a graphical illustration of the FTIR cure kinetics of the radiation-cured coatings of Examples 1–3 and Comparative Example A.

Cure speed for the compositions of Examples 1–3 and Comparative Example A are graphically depicted in FIG. 2 which shows the cure behavior of the compositions at 810 cm$^{-1}$ subjected to Fourier transformation infrared spectroscopy (FTIR). The exposure time of the samples to radiation is plotted on the abscissa, while the percent reacted acrylate unsaturation is plotted on the ordinate. Cure time of the radiation-curable compositions of the present invention as shown in preferred Example 1 is not increased over that demonstrated by Comparative Example A.

For an insulating coating according to the present invention, density at 25° C. is about 1.02 g/ml. Elongation is at least 20%, preferably at least 50% and more preferably at least 100% or more. Elongation of at least about 200% is attainable in cured coatings according to the present invention. The weight loss of the cured coating at 100° C. for 40 min is ≦5%, and shrinkage upon cure is ≦10%, with respect to the density of cured material. Bond strength is preferably rated about 4 to about 5. Cured insulating coating bonds are preferably stable under exposure to about 85° C. at about 95% relative humidity for at least 2,000 hrs.

Thiol compounds and thiol-ene systems are discussed in Chiou et al., Macromolecules 30(23):7322–7328 (1997) and Chiou et al., ACS Symp. Ser., 673:150–166 (1997), the complete disclosures of which are hereby incorporated by reference.

The use of N-vinylpyrrolidone as a diluent in the coating composition of the present invention is preferred. However, the coating composition of the present invention preferably does not comprise substantial amounts (amounts greater than 8 wt. % of the total weight of the composition) of monomers with relatively strong dipole moments such as N-vinylpyrrolidone, phenoxyethylacrylate, polyoxyalkylene-alkylphenolacrylate and the like. The preferred amount of N-vinylpyrrolidone in the present invention is between about 1 wt. % and about 5 wt. %. The coating composition furthermore, preferably does not comprise, in substantial amounts, those monomers for which dipoles can be easily included, such as aromatic groups containing acrylates such as phenylacrylates. Surprisingly, while substantial amounts (>8.0 wt. %) of the high dipole moment, diluent, N-vinylpyrrolidone are not preferred (See Example 3) for use in the present invention, the same diluent used in smaller amounts proves to be most effective in providing a coating composition with excellent insulating properties (See Example 1). Too little of the same diluent (0.0 wt. %) as shown in Comparative Example A results in a cured coating composition with poorer insulating properties. See Burkes, J. D. and J. H. Shulman, *Properties in Dielectrics*, John Wiley and Sons, Inc., 1960, Chapter: Dielectric Properties of Polymeric Systems by A. J. Curtis, for a discussion of the relationship of composition viscosity and dipole stability of polymer systems, the complete disclosure of which is hereby fully incorporated by reference. The person skilled in the art can easily determine the amount of diluent of this type which can be optimally allowed in the composition by measuring the dissipation factor of the cured coating.

In addition to the above components, the composition may also contain other components that are known to those skilled in the art including stabilizers, surfactants, plasticizers, chain transfer agents and the like.

In addition, it may be useful to use a small amount of pigment or dye to color the cured coating. This allows simple visual control of the coated electrical conductor. This is in particular useful, in case the electrical conductor is only partly coated. Suitable pigments or dyes are for example copper phthalocyanine blue, crystal violet lactone (blue), crystal malachite green, sheet fed rubine (red). The amount of pigment, if used, will in general be about 0.2 wt. % to about 5 wt. % relative to the coating composition.

The coating composition may be applied on the electrical conductor using known coating methods, such as spraying, vacuum coating, dipping and doctoring. The coating composition may be applied under a nitrogen atmosphere to preclude oxygen inhibition; however, this is not strictly necessary. If, for example, a relatively large amount of photoinitiator is used in the composition, the cure of the surface of the film is adequate as well.

The invention will be further demonstrated by the following, non limiting examples.

EXAMPLES 1–3 and

Comparative Example A

Examples 1–3 and Comparative Example A were prepared by means well known in the art using the premixture ingredients as presented in Table 1. Test procedures to determine viscosity and adhesion using the 180° bend adhesion test after hot oil soak, and crosshatch adhesion test as described in the Test Procedures section. The results of those tests are summarized in Table 1. Dielectric dissipation factor for Examples 1–3 and Comparative Example A. were conducted by procedures described in the Test Procedures section. The dissipation factor tests results are summarized in Table 2 and presented graphically in FIG. 1. Additional properties were determined for each of the Examples and Comparative Example A according to the test procedures as presented in the test procedures section. These results are presented in Tables 1 and 3 and in FIG. 2.

Test Procedures

Tg (glass transition temperature) was determined for Examples 1–3 and Comparative Example A. Elastic modulus (E'), viscous modulus (E"), and tan delta (E"/E') were measured by conventional DMA methods. A free film specimen of cured material was cut to size (about 35 mm length), measured for width and thickness and mounted. The environmental chamber containing the sample was brought to 80° C. The sample was stretched before temperature sweep was started. The temperature was lowered in prescribed steps to the starting temperature. The temperature sweep was started and allowed to proceed upwards on the temperature scale until the material was beyond the glass transition range and well into the rubbery range. The DMA instrument (Rheometrics Solids Analyzer, RSA-II equipped with a personal computer) produced a plot of the data on the computer screen. The temperature at which E' is 1,000 MPa and E' is 100 MPa was calculated from this plot, as well as the tan delta peak. The minimum value of E' attained in the rubbery range was measured.

Cured coating samples were tested for flexibility and structural integrity under the strain required for a 180° bend of coated 0.0625" thick aluminum substrate over 0.125" mandrel at 25° C. Visual examination of the tested samples indicated the cured samples tested maintained structural integrity and did not delaminate from the aluminum substrate.

Samples of 25 μm thick cured coating compositions were tested for adhesion to a 1.59 mm thick aluminum panel which was bent 180° over a 6.4 mm diameter mandrel and immersed in 150° C. oil for 28 days.

Adhesion of the 25 μm thick cured coating samples was tested using crosshatch method well known in the art and described in detail in "Coating Technology Handbook", by U. Zorll, published by Marcel Dekker, Inc., (1991) and incorporated herein by reference. The results are shown in Table 1.

Dissipation factor of the cured coatings was tested by methods well known in the art. The temperature sensitivity of dissipation factors (%) for Examples 1–3 and Comparative Example A for temperatures ranging from 25° C. through 185° C. are shown in Table 2. FIG. 1 provides a graphic presentation of dielectric dissipation factor recordings for cured coating composition Examples 1–3 and Comparative Example A.

The cure behavior of Examples 1–3 and Comparative Example A were tested using known FTIR test procedures. Acrylate-containing coating blends at 810 cm$^{-1}$ were subjected to Fourier transformation infrared spectroscopy (FTIR). The exposure time of the samples to radiation is plotted on the abscissa, while the percent reacted acrylate unsaturation is plotted on the ordinate.

TABLE 1

| Components (wt. %) | Comp A | Ex. 1 | Ex. 2 | Ex. 3 |
|---|---|---|---|---|
| Polycarbonate urethane diacrylate oligomer | 48.25 | 46.25 | 46.25 | 46.25 |
| NVP | 0.0 | 4.0 | 2.0 | 8.5 |
| IBOA | 43.45 | 41.45 | 41.45 | 36.75 |
| γ-mercaptopropyl-trimethoxysilane | 2.0 | 2.0 | 2.0 | 2.0 |
| IRGACURE 651 | 3.0 | 3.0 | 3.0 | 3.0 |
| IRGACURE 1035 | 0.3 | 0.3 | 0.3 | 0.5 |
| DAROCURE 1173 | 3.0 | 3.0 | 3.0 | 3.0 |
| Viscosity (@ 25° C.) (cps) | 635 | 490 | 840 | 650 |
| Tg from tan δ (° C.) | 42.6 | 43.0 | 36.5 | 47.5 |
| Tensile strength (MPa) | 20 ± 5 | 9.3 ± 1 | 20 ± 4 | 24 ± 4 |
| Modulus (MPa) | 101 ± 14 | 13 ± (<1) | 44 ± 4 | 78 ± 5 |
| Elongation (%) | 194 ± 18 | 247 ± 11 | 202 ± 13 | 237 ± 10 |
| 180° Bend Adhesion test | Pass | Pass | Pass | Pass |
| Cross Hatch Adhesion Test | Pass | Pass | Pass | Pass |
| Hot Oil Soak Test 125° C. 48 Hours | Pass | Pass | Pass | Pass |

NVP is N-vinylpyrrolidone.
IBOA is isobornylacrylate.
DAROCURE 1173 (Ciba-Geigy) is a photoinitiator.
IRGACURE 651 (Ciba-Geigy) is a photoinitiator.
IRGACURE 1035 (Ciba-Geigy) is a photoinitiator.

TABLE 2

Dissipation Factor of UV Curable Compositions of Examples 1–3 and Comparative Example A

| Temp. ° C. | Comp A | Ex. 1 | Ex. 2 | Ex. 3 |
|---|---|---|---|---|
| 25 | 0.0440 | 0.0200 | 0.0520 | 0.0410 |
| 35 | 0.0610 | 0.0250 | 0.0690 | 0.0530 |
| 45 | 0.0760 | 0.0280 | 0.0420 | 0.0770 |
| 55 | 0.0750 | 0.0270 | 0.0240 | 0.0940 |
| 65 | 0.0400 | 0.0190 | 0.0220 | 0.0940 |
| 75 | 0.0510 | 0.0140 | 0.0440 | 0.0780 |
| 85 | 0.1120 | 0.0360 | 0.0830 | 0.0730 |
| 95 | 0.2350 | 0.0700 | 0.1520 | 0.1320 |
| 105 | 0.3860 | 0.1190 | 0.2530 | 0.2820 |
| 115 | 0.6700 | 0.1920 | 0.4350 | 0.5730 |
| 125 | 0.9500 | 0.2680 | 0.6790 | 1.1000 |
| 135 | 1.0900 | 0.3330 | 0.9060 | 1.6300 |
| 145 | 1.1200 | 0.3920 | 1.0900 | 1.8700 |
| 155 | 1.1700 | 0.4290 | 1.2600 | 1.8400 |
| 165 | 1.2500 | 0.4870 | 1.2900 | 1.3200 |
| 175 | 1.4100 | 0.6120 | 1.0600 | 1.4800 |
| 185 | 1.7400 | 0.8540 | 1.0000 | 1.9800 |

The dissipation factors of Examples 1–3 and Comparative Example A are summarized in FIG. 1.

TABLE 3

FTIR Cure kinetics of Examples 1–3 and Comparative Example A

| time (sec) | Comp A | Ex. 1 | Ex. 2 | Ex. 3 |
|---|---|---|---|---|
| 0.0000 | 0.0000 | 0.0000 | 0.0000 | 0.0000 |
| 0.1250 | 6.0000 | 5.8000 | 4.1000 | 16.3000 |
| 0.2500 | 20.4000 | 18.9000 | 13.5000 | 34.4000 |
| 0.3750 | 35.9000 | 34.3000 | 25.2000 | 49.9000 |
| 0.5000 | 45.1000 | 44.7000 | 36.7000 | 61.3000 |
| 1.000 | 62.8000 | 61.6000 | 59.1000 | 81.4000 |
| 1.5000 | 66.8000 | 65.8000 | 64.5000 | 87.5000 |
| 2.000 | 68.4000 | 67.5000 | 66.7000 | 90.1000 |
| 3.000 | 70.2000 | 69.2000 | 68.7000 | 93.7000 |
| 5.000 | 71.5000 | 70.7000 | 70.3000 | 96.4000 |
| 10.000 | 73.4000 | 72.7000 | 72.4000 | |

The FTIR Cure kinetics of Examples 1–3 and Comparative Example A are summarized in FIG. 2.

While the invention has been described in detail and with reference to specific embodiments thereof, it will be apparent to those of ordinary skill in the art that various changes and modifications can be made therein without departing from the spirit and scope thereof.

What is claimed is:

1. An insulating coating for an electrical conductor, said insulating coating having a thickness between 2.5 μm and about 500 μm and being obtained by radiation curing a composition that is formulated, prior to cure, from at least the following ingredients:

(A) about 15 wt. % to about 80 wt. %, relative to the total weight of said composition, of at least one radiation curable polycarbonate acrylate oligomer;

(B) about 1 wt. % to about 20 wt. %, relative to the total weight of said composition, of at least one vinyl reactive diluent;

(C) about 10 wt. % to about 80 wt. %, relative to the total weight of said composition, of at least one acrylate monomer diluent;

(D) about 0.5 wt. % to about 10 wt. %, relative to the total weight of said composition, of at least one thiol compound.

2. The insulating coating of claim 1, wherein said comprises, relative to the total weight of the composition, 3 wt. % to 20 wt. % of said at least one vinyl reactive diluent.

3. An insulating coating according to claim 2, wherein the at least one acrylate monomer diluent comprises isobornylacrylate.

4. An insulating coating according to claim 2, wherein the at least one vinyl reactive diluent comprises a diluent selected from the group consisting of N-vinylpyrrolidone and N-vinyl caprolactam.

5. An insulating coating according to claim 2, wherein composition is further formulated from at least one member selected from the group consisting of photoinitiators, stabilizers, chain transfer agents, plasticizers, light stabilizers, UV screening compounds, leveling agents, wetting agents and preservatives.

6. An insulating coating according to claim 2, wherein the composition is further formulated from at least one photoinitiator selected from the group consisting of derivatives of mercaptobenzothiazoles, derivatives of mercaptobenzoxazoles, derivatives of benzophenones acetophenone derivatives, derivatives of benzoin alkyl ethers, derivatives of benzil ketals, derivatives of monoacylphosphine oxides and derivatives of bisacylphosphine oxides.

7. As insulating coating according to claim 2, wherein thiol compound comprises γ-mercaptopropyl-trimethoxysilane.

8. An insulating coating according to claim 2, wherein said electrical conductor is made from a material selected from the group consisting of metals, ceramics, silicones and polymers.

9. An insulating coating according to claim 2, wherein said electrical conductor is a component of a device selected from the group consisting of semiconductors, printed circuit boards, capacitors, resistors, motors, coils, transformers, generators and electrical wiring systems.

10. An insulating coating according to claim 2, wherein said electrical conductor is made from a metallic material selected from the group consisting of iron, copper, aluminum and silver.

11. An insulating coating according to claim 2, wherein the cured coating has a dielectric dissipation factor at 60 Hz at 150° C. of lower than about 0.5.

12. An insulating coating according to claim 2, wherein the cured coating is formulated from the coating composition which further comprises a photoinitiator.

13. An insulating coating according to claim 12, wherein the cured coating is a coating cured by irradiation with light with a wavelength between about 200 $\mu$m to about 700 $\mu$m, and the photoinitiator is present in an amount of about 1 wt. % to about 10 wt. % of the coating composition.

14. An insulating coating according to claim 2, wherein the cured coating is formulated from the coating composition which further comprises an adhesion promoter.

15. An insulating coating according to claim 14, wherein the adhesion promotor is an acid functional compound.

16. An insulating coating to claim 2, wherein the cured coating further comprises about 0.2 wt. % to about 5 wt. % of a pigment or a dye.

17. An insulating coating according to claim 2, wherein the cured coating has a thickness of about 10 $\mu$m to About 100 $\mu$m.

18. An insulating coating according to claim 2, wherein the cured coating has a dielectric constant lower than about 5.

19. An insulating coating according to claim 2, wherein the cured coating has a dielectric dissipation factor lower than about 0.05 (60 Hz, 24° C.) after hot oil exposure (150° C.).

20. An insulating coating according to claim 2, wherein said coating has a dielectric dissipation factor (60 Hz, 140° C.) of lower than about 1.0.

21. The insulating coating of claim 2 wherein said coating has a dielectric dissipation factor at 60 Hz and 24° C. of less than about 0.05.

22. The coating of claim 2, wherein said polycarbonate acrylate oligomer comprises ether groups.

23. The coating of claim 1, wherein said composition comprises, relative to the total weight of the composition, 1–8 wt % of said vinyl reactive diluent.

24. A method of manufacturing an insulating coating for an electrical conductor comprising:
(A) coating an electrical conductor with a radiation-curable coating composition formulated from at least the following ingredients:
(i) about 15 wt. % to about 80 wt. %, relative to the total weight of said composition, of at least one radiation-curable polycarbonate acrylate oligomer;
(ii) about 1 wt. % to about 20 wt. %, relative to the total weight of said composition, of at least one vinyl reactive diluent;
(iii) about 10 wt. % to about 80 wt. %, relative to the total weight of said composition, of at least one acrylate monomer diluent;
(iv) about 0.5 wt. % to about 10 wt. %, relative to the total weight of said composition, of at least one thiol compound, and
(B) curing said composition;
wherein said insulating coating has a thickness of about 2.5 $\mu$m to about 500 $\mu$m.

25. The method of claim 24, wherein said composition comprises, relative to the total weight of the composition, 3–20 wt % of said vinyl reactive diluent.

26. The method of claim 25, wherein said insulating coating has a dielectric dissipation fator at 60 Hz and 24° C. of less than about 0.05, and a dielectric dissipation factor at 60 Hz and 150° C. of less than about 0.5.

27. The method of claim 25, wherein a 25 $\mu$m thick layer of said composition, when cured, has an elongation at break of greater than about 50%.

28. The method of claim 25, wherein said polycarbonate acrylate oligomer comprises ether groups.

29. The coating of claim 24, wherein said composition comprises, relative to the total weight of the composition, 1–8 wt % of said vinyl reactive diluent.

30. A 2.5–500 $\mu$m thick insulating coating for an electrical conductor, said insulating coating being obtained by curing a composition consisting essentially of:
(A) about 15 wt. % to about 80 wt. %, relative to the total weight of said composition, of at least one radiation curable acrylate oligomer;
(B) about 1 wt. % to about 20 wt. %, relative to the total weight of said composition, of at least one vinyl reactive diluent;
(C) about 10 wt. % to about 80 wt. %, relative to the total weight of said composition, of at least one acrylate monomer diluent consisting of:
(i) an acrylate group; and
(ii) a $C_4$–$C_{20}$ alkyl or polyether moiety;
(D) about 0.5 wt. % to about 10 wt. %, relative to the total weight of said composition, of at least one thiol compound; and
(E) optionally, at least one member selected from the group consisting of photoinitiators, stabilizers, chain transfer agents, plasticizers, light stabilizers, UV screening compounds, leveling agents, wetting agents, and preservatives.

31. The coating of claim 30, wherein said composition comprises, relative to the total weight of the composition, 3–20 wt % of said vinyl reactive diluent.

32. The coating of claim 31, wherein said oligomer has a backbone comprising a polycarbonate diol residue.

33. The coating of claim 30, wherein said composition comprises, relative to the total weight of the composition, 1–8 wt % of said vinyl reactive diluent.

* * * * *